(12) United States Patent
Biem et al.

(10) Patent No.: US 7,973,715 B2
(45) Date of Patent: Jul. 5, 2011

(54) DETERMINING A DIRECTION OF ARRIVAL OF SIGNALS INCIDENT TO A TRIPOLE SENSOR

(75) Inventors: Alain Biem, Hawthorne, NY (US); Lars Kristen Selberg Daldorff, Helsinki (FI); Deepak Srinivas Turaga, Hawthorne, NY (US); Olivier Verscheure, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 12/425,689

(22) Filed: Apr. 17, 2009

(65) Prior Publication Data

US 2010/0265138 A1  Oct. 21, 2010

(51) Int. Cl.
*G01S 5/02* (2010.01)
(52) U.S. Cl. ........................................................ 342/417
(58) Field of Classification Search ................... 342/417
See application file for complete search history.

(56) References Cited

U.S. PATENT DOCUMENTS

| | | | | |
|---|---|---|---|---|
| 6,078,788 | A * | 6/2000 | Haardt | 455/65 |
| 6,195,064 | B1 * | 2/2001 | Andrews et al. | 343/797 |
| 6,317,098 | B1 * | 11/2001 | Andrews et al. | 343/797 |

OTHER PUBLICATIONS

Yilmazer et al., "2-D unitary matrix pencil method for efficient direction of arrival estimation", Jul. 18, 2006.*
Khan et al., "Comparative Analysis of Various Pencil Methods for Direction of Arrival Estimation", 2010.*
Aurlien Coillet. "Calibration of the LOIS antennas", Diploma thesis, cole Normale Suprieure de Lyon, Universite Claude Bernard Lyon. Department of Astronomy and Space Physics, Uppsala University, Upsala, Sweden, Jun. 2006.
Bugra Gedik et al., "SPADE: The System S Declarative Stream Processing Engine", In Proc. of SIGMOD, 2008.
Richard Roy et al., "ESPIRIT—Estimation of Signal Parameters Via Rotational Invariance Techniques", IEEE Transactions on Acoustics, Speech and Signal Processing, vol. 37, No. 7, Jul. 1989.
Judd A. Rohwer, et al., "Least Squares Support Vector Machines for Direction of Arrival Estimation with Error Control and Validation", In Global Telecommunications Conference (GLOBECOM), vol. 4 of 1-5, pp. 2172-2176, Jul. 2003.
Ching-Sung Shieh, et al., "Direction of Arrival Estimation Based on Phase Differences Using Neural Fuzzy Network", IEEE Transactions on Antennas and Propagation, vol. 48, No. 7, Jul. 2000.

(Continued)

*Primary Examiner* — Thomas H Tarcza
*Assistant Examiner* — Frank McGue
(74) *Attorney, Agent, or Firm* — F Chau & Associates, LLC; William Stock

(57) ABSTRACT

A system to determine a direction of arrival of each of a plurality of constituent signals of a superimposed wave includes a tripole radio antenna, a sampling unit, a frequency determining unit, an amplitude and phase determining unit, and a direction determining unit. The sampling unit is configured to periodically sample an output of the tripole radio antenna to generate at least two samples. The frequency determining unit is configured to determine frequencies for each dimension of the constituent signals by performing a unitary matrix pencil method on the at least two samples. The amplitude and phase determining unit is configured to determine x, y, z amplitudes and x, y, z phases for each constituent signal using the determined frequencies. The direction determining unit is configured to determine a direction of arrival for each of the constituent signals from the determined frequencies, amplitudes, and phases.

25 Claims, 4 Drawing Sheets

OTHER PUBLICATIONS

Figure 1:
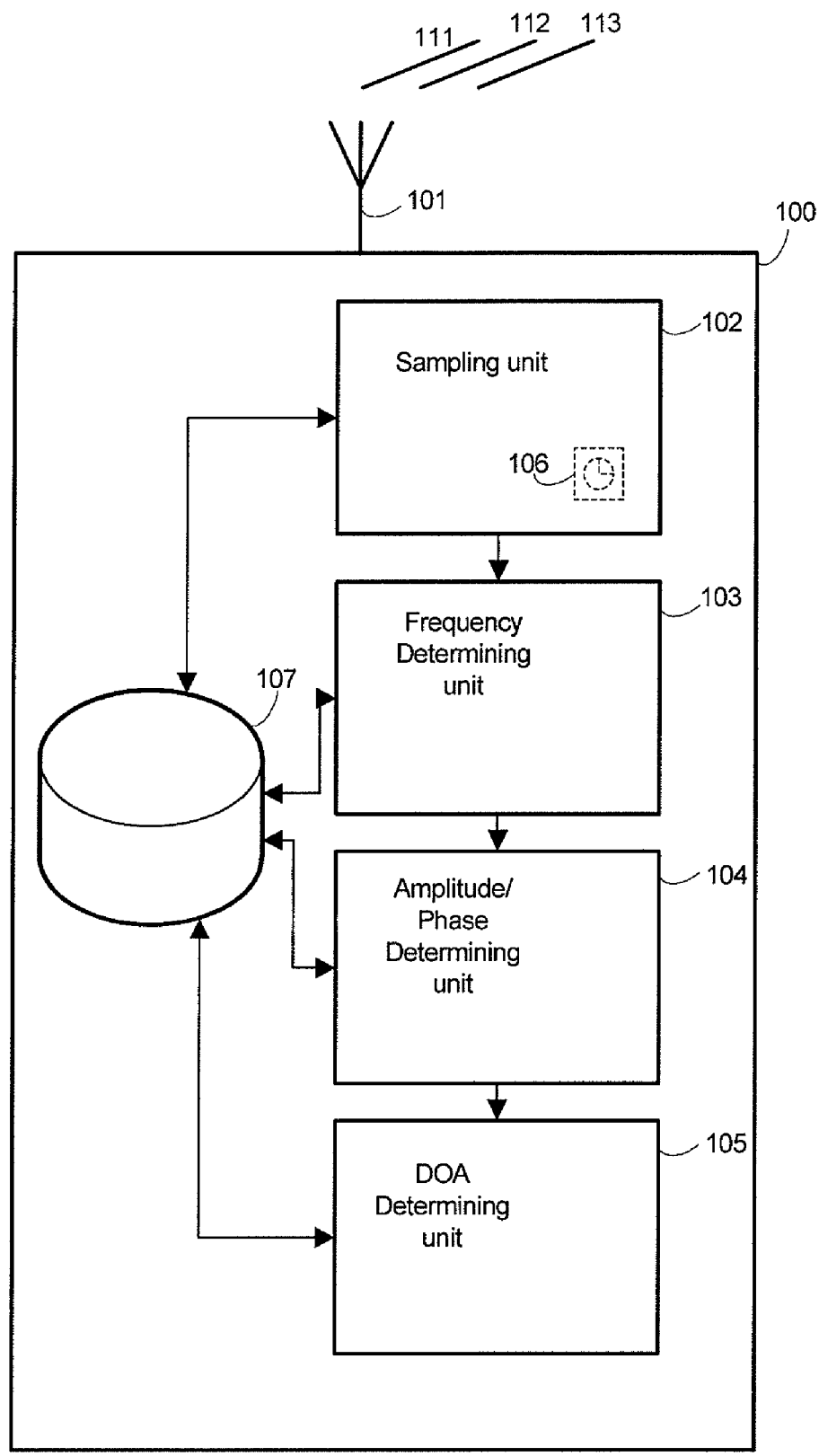

Alle-Jan Van Der Veen, "Algebraic Methods for Deterministic Blind Beamforming", Proceedings of the IEEE, vol. 86, No. 10, Oct. 1998.

Nuri Yilmazer, et al., "Utilization of a Unitary Transform for Efficient Computation in the Matrix Pencil Method to Find the Direction of Arrival", IEEE Transactions on Antennas and Propagation, vol. 54, No. 1, Jan. 2006.

Stoica, Petre et al., "Maximum Likelihood Methods for Direction-of-Arrival Estimation", IEEE Transactions on Acoustsics, Speech, and Signal Processing, vol. 38, No. 7 Jul. 1990.

* cited by examiner

DETERMINING A DIRECTION OF ARRIVAL OF SIGNALS INCIDENT TO A TRIPOLE SENSOR

BACKGROUND OF THE INVENTION

1. Technical Field

The present disclosure relates generally to determining a direction of arrival of multiple signals incident on a sensor, and more particularly to methods and systems to determine the direction of arrival of multiple signals incident on a tripole sensor.

2. Discussion of Related Art

Electromagnetic signals or radiation are self-propagating waves in a vacuum or in matter. Electromagnetic signals include electric and magnetic field components that oscillate in phase perpendicular to each other and perpendicular to the direction of energy propagation. Electromagnetic signals can be classified into several types according to the frequency of its wave, including radio waves, microwaves, terahertz radiation, infrared radiation, visible light, ultraviolet radiation, X-rays and gamma rays.

In the field of astronomy, electromagnetic signals are studied because they may pass through gas and dust in space, and terrestrial atmospheres with little distortion. Given this property, there is an interest in the scientific community to expand the exploration of the radio signal spectrum, for example, to image and understand various astronomical phenomena. Such exploration may help scientists to understand the transient sky, to probe accretion onto black holes, to identify orphan gamma-ray burst afterglows, to discover new and unknown transient phenomena from currently undiscovered celestial objects, etc.

More generally, sensors (e.g., a radio antenna) may be used to receive the electromagnetic signals for subsequent study. However, it can be difficult to identify the direction of arrival (DOA) of an electromagnetic signal incident on a sensor, especially in the presence of multiple such signals, interference, and noise. When multiple signals are incident on the sensor, the result is a superimposed combination, which can make it difficult to identify the individual signals of interest. DOA estimation is related to Blind Source Separation, which is the separation of a set of signals from a set of mixed signals, with little or no information about the source signals or the mixing process. Conventional approaches for DOA estimation use a spatially distributed array of multiple sensors (e.g., multiple antennas) to disambiguate the multiple signals of interest. With the use of multiple sensors, various techniques are available for DOA estimation. These techniques include phase-based interferometry methods, Eigen decomposition methods, and machine learning methods.

Phase interferometry (PI) based methods use measured phase differences across an array of sensors to estimate the DOA. While a PI based method can be applied to simple radar signals, it is not as useful when the signals become more complex. Decomposition techniques exploit correlations inherent in time-dependent signals to estimate the components and the direction of the incoming signals. These approaches include the Multiple Signal Classification (MUSIC) algorithm, Maximum Likelihood Methods, and Estimation of signal parameters via rotational invariance techniques (ESPRIT) for narrow-band planar signals. These approaches offer asymptotically unbiased estimates of the direction of the irradiating sources, but are computationally expensive and not easily implemented in a real-time environment. Machine learning techniques may perform well, but their success is contingent on the availability of a sufficiently large training set, especially for large-scale radio astronomy observations.

Recent advances in antenna design have led to the development of a practical tripole antenna that receives all three components (e.g., x, y, and z dimensions) of incident electromagnetic signals in terms of the resulting electric field or generated current. For a single incident wave, the DOA may be directly computed from a measurement of these three components. However, when multiple waves with different frequencies are incident on a single tripole sensor, it can be difficult to compute the DOA.

Thus, there is a need for methods and systems that can determine a direction of arrival of multiple signals incident on a tripole sensor.

BRIEF SUMMARY

According to an exemplary embodiment of the present invention, a system to determine a direction of arrival of each of a plurality of constituent signals of a superimposed wave includes a tripole radio antenna receiving the superimposed wave, a sampling unit, a frequency determining unit, an amplitude and phase determining unit, and a direction determining unit. The sampling unit is configured to periodically sample an output of the tripole radio antenna to generate at least two samples. The frequency determining unit is configured to determine frequencies for each of the constituent signals by performing a unitary matrix pencil method on the at least two samples. The amplitude and phase determining unit is configured to determine x, y, z amplitudes and x, y, z phases for each constituent signal using the determined frequencies. The direction determining unit is configured to determine a direction of arrival for each of the constituent signals from the determined frequencies, amplitudes, and phases.

According to an exemplary embodiment of the present invention, a method to determine a direction of arrival of a signal includes: receiving a superimposed wave (e.g., including a plurality of constituent signals) incident on a single tripole sensor, sampling in a computer processor the superimposed wave during at least two different time periods to generate at least two samples, determining in a computer processor frequencies for each of the constituent signals by performing a unitary matrix pencil method on the at least two samples, determining in a computer processor x, y, and z amplitudes and x, y, and z phases using the determined frequencies, and determining a direction of arrival for each of the constituent signals from the determined frequencies, amplitudes, and phases. For each of the constituent signals there are amplitude and phase pairs for each one of the x, y, and z dimensions.

According to an exemplary embodiment of the present invention, a method to determine a direction of arrival of each of a plurality of constituent signals of a superimposed wave includes: sampling the superimposed wave incident on a single tripole sensor during at least two different time periods to generate at least two samples, determining frequencies, amplitudes and phases for each dimension of the constituent signals by performing a unitary matrix pencil method (UMP) on the at least two samples, and determining a direction of arrival for each of the constituent signals from the determined frequencies, amplitudes, and phases. The plurality of constituent signals have a count of M, the at least two samples have a count of N, N and M are natural numbers, and N is at least 2*M.

According to an exemplary embodiment of the present invention, a method to determine a direction of arrival of constituent signals of a superimposed wave includes: observing N samples of the superimposed wave incident on a tripole sensor, determining in a computer processor frequencies, x, y, z amplitude components, and x, y, and z phase components from the observed samples, determining in a computer processor an electric field for each of the constituent signals from the determined components, and determining in a computer processor a direction of arrival of the constituent signals from the determined electric field, where N is a natural number greater than 2 and the frequencies are determined using a unitary matrix pencil method.

BRIEF DESCRIPTION OF THE SEVERAL VIEW OF THE DRAWINGS

Figure 2:
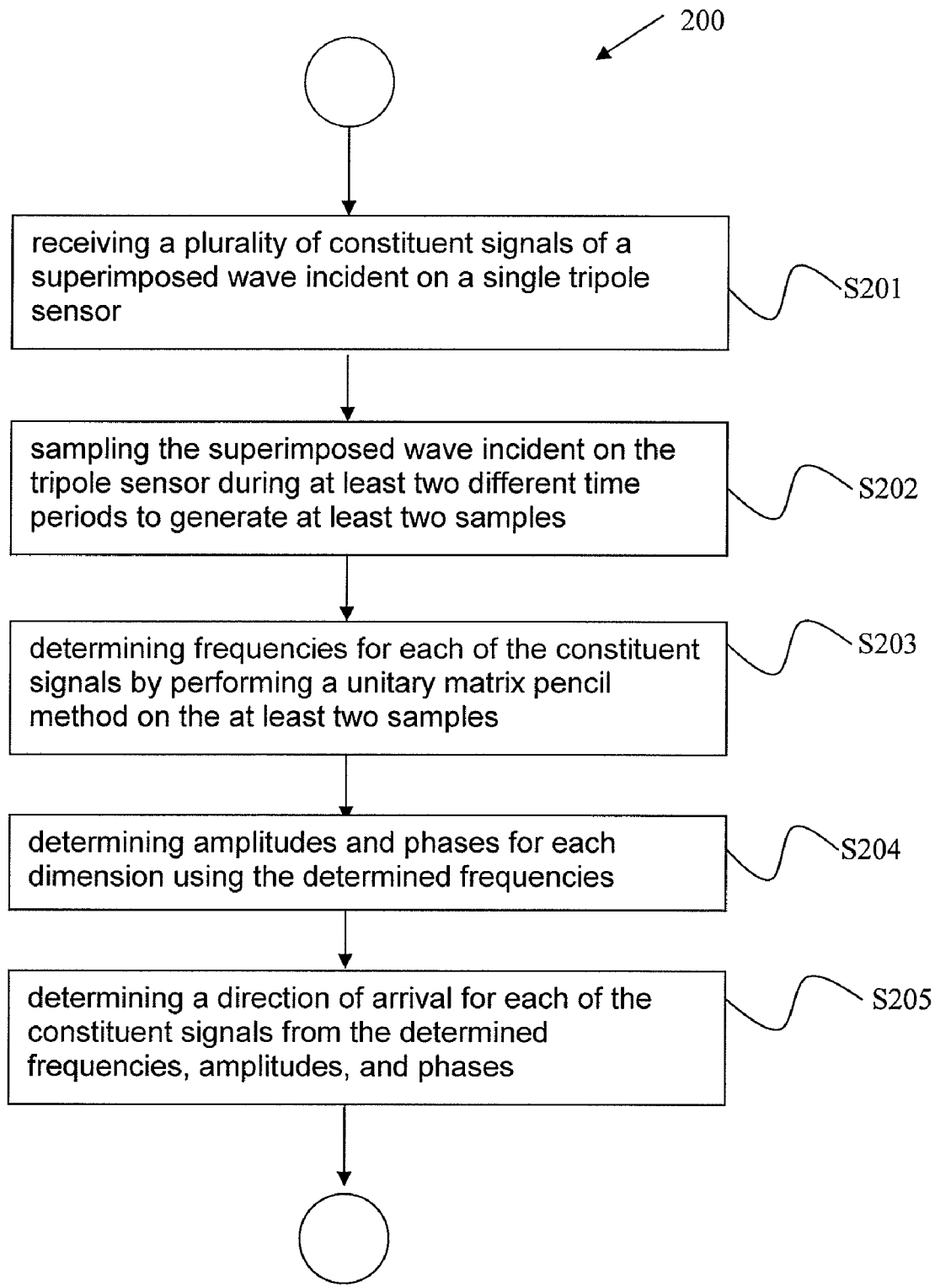
Figure 3:
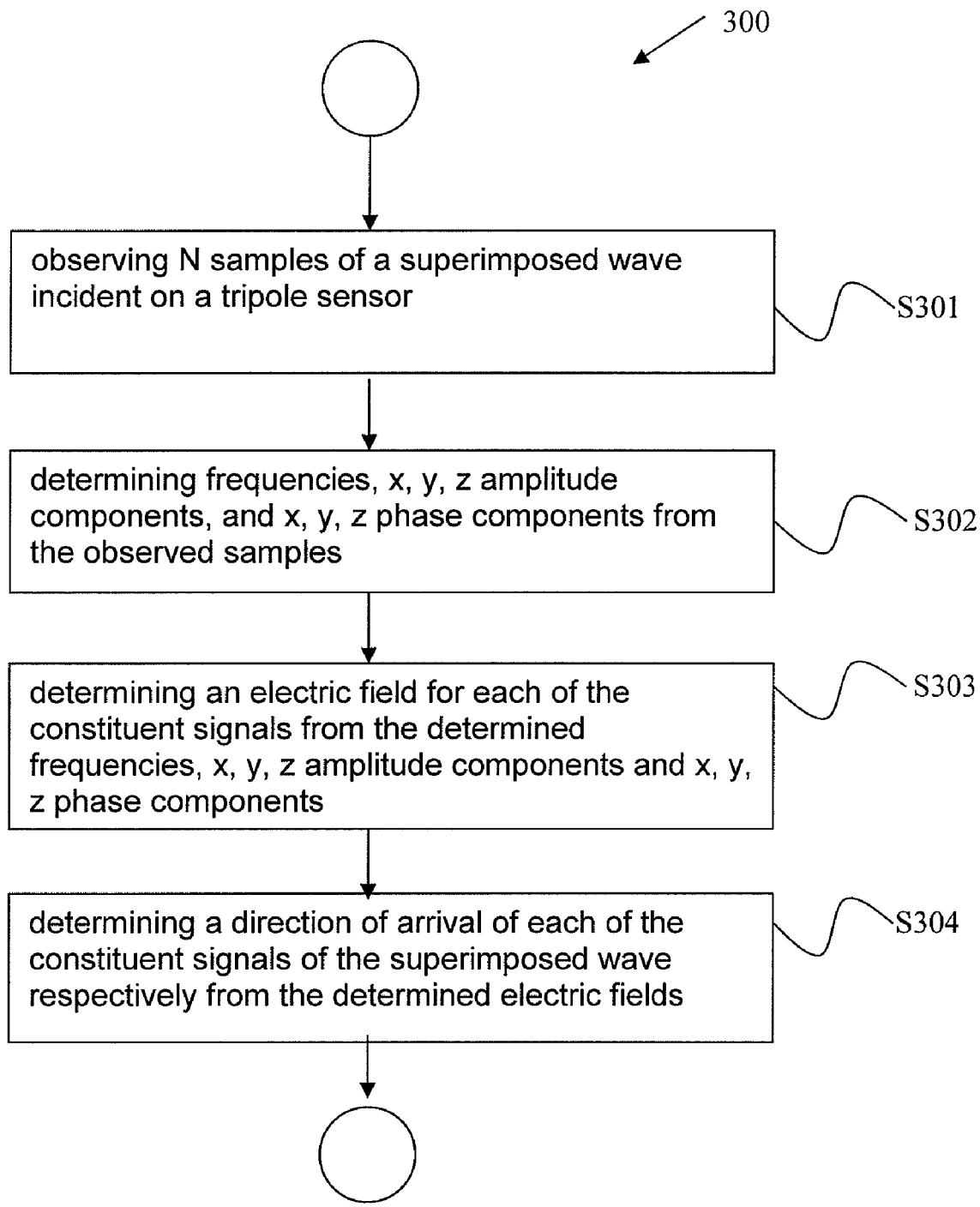
Figure 4:
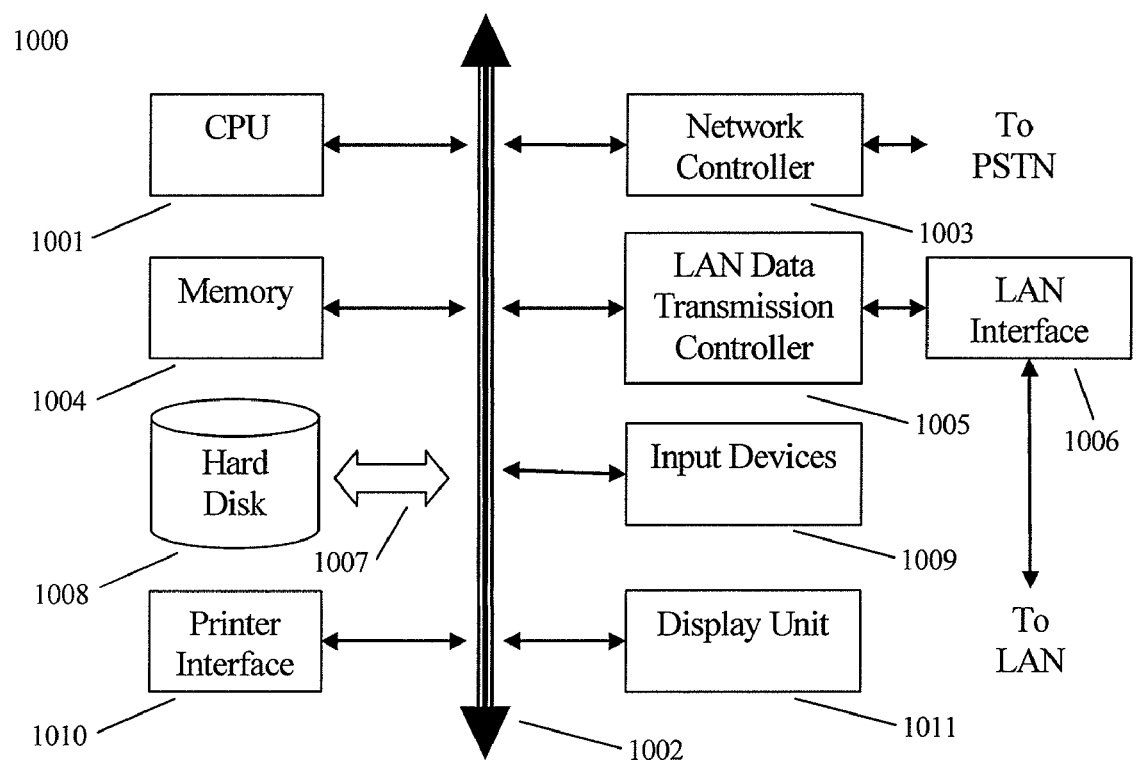

Exemplary embodiments of the invention can be understood in more detail from the following descriptions taken in conjunction with the accompanying drawings in which:

FIG. 1 illustrates a system to determine the direction of arrival of multiple signals of a superimposed wave incident to a tripole sensor, according to an exemplary embodiment of the present invention; and FIG. 2 illustrates a method to determine the direction of arrival of multiple constituent signals of a superimposed wave incident to a tripole sensor, according to an exemplary embodiment of the present invention;

FIG. 3 illustrates a method to determine a direction of arrival of constituent signals of a superimposed wave, according to an exemplary embodiment of the present invention; and FIG. 4 shows an example of a computer system capable of implementing the methods and systems according to embodiments of the present invention.

DETAILED DESCRIPTION

When multiple waves with different frequencies are incident on a sensor (e.g., a radio antenna), the resulting superimposed wave exhibits a DOA that varies over time with a certain periodicity, even if the original waves have a fixed DOA. Embodiments of the present invention make use of multiple temporal observations of the superimposed wave and a unitary matrix pencil method to identify the DOA for each incident wave. In general, exemplary methods and systems to determine the DOA of multiple signals incident on a single tripole sensor will now be discussed in further detail with reference to illustrative embodiments of FIGS. 1-4.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more computer readable medium (i.e., program storage devices such as a hard disk, magnetic floppy disk, RAM, ROM, CD ROM, etc., and executable by any device or machine comprising suitable architecture, such as a general purpose digital computer having a processor, memory, and input/output interfaces. It is to be further understood that, because some of the constituent system components and process steps depicted in the accompanying figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

FIG. 1 illustrates a system 100 to determine the direction of arrival of multiple constituent signals of a superimposed wave incident to a tripole sensor, according to an exemplary embodiment of the present invention. Referring to FIG. 1, the system 100 includes a tripole radio antenna 101, which may receive a superimposed wave that contains constituent signals, such as signals 111, 112 and 113. Of course, the wave received by tripole radio antenna 101 may contain more or less constituent signals. System 100 also includes a sampling unit 102, a frequency determining unit 103, an amplitude/phase determining unit 104, and a direction determining unit 105. The sampling unit is 102 configured to periodically sample an output of the tripole radio antenna 101 to generate at least two samples when the antenna receives the superimposed wave.

The sampling unit 102 may generate samples of uniform duration. The sampling unit 102 may include a timer 106 to determine when a new sample is to be taken. The system 100 may include storage 107 such as a buffer to store the samples, parameters, in-process calculations, etc. For example, the uniform duration may be chosen from one of several stored duration times. In one embodiment of the present invention, one sample may be taken every 8 ns or range between 6 to 10 ns. However, the present invention is not limited to any particular sample rate.

The frequency determining unit 103 is configured to determine frequencies of the constituent signals by performing a unitary matrix pencil method on the at least two samples. The amplitude/phase determining unit 104 is configured to determine amplitudes and phases for each of the x, y, and z dimensions using the determined frequencies. For each of constituent signals there are amplitude and phase pairs for each of the x, y, and z dimensions.

The direction determining unit 105 is configured to determine a direction of arrival for each of the constituent signals from the determined frequencies, amplitudes, and phases. For example, the frequencies, amplitudes, phases, and direction of arrival may be computed using any of the below described methods.

FIG. 2 illustrates a method 200 of determining the direction of arrival of multiple constituent signals of a superimposed wave incident to a tripole sensor, according to an exemplary embodiment of the present invention. The method may be implemented using one or more tripole sensors that receive a superimposed wave that contains constituent signals, such as shown in FIG. 1. Steps of this method may be performed in a computer processor, such as shown in FIG. 4. Referring to FIG. 2, the method 200 includes receiving a plurality of constituent signals of a superimposed wave incident on a single tripole sensor (S201), sampling the superimposed wave during at least two different time periods to generate at least two samples (S202), determining frequencies for each of the constituent signals by performing a unitary matrix pencil method on the at least two samples (S203), determining amplitudes and phases for each dimension using the determined frequencies (S204), and determining a direction of arrival (DOA) for each of the constituent signals from the determined frequencies, amplitudes, and phases (S205). The determining of the DOA may include correlating or combining each determined frequency with its corresponding amplitudes and phases and determining the DOA from the correlated frequency, amplitudes and phases.

The complete set of dimensions for the determined frequencies, amplitudes, and phases includes the 'X', 'Y', and 'Z' dimensions. For example, assume two constituent signals, e.g., wave 1 and wave 2 make up the superimposed wave. Determining the frequencies of the two constituent signals could reveal, for example, that wave 1 has a 500 kz frequency and wave 2 has a 1000 kz frequency. Determining the amplitudes and frequencies could reveal, for example, that wave 1 has an x-component amplitude $Ax^1=10$, an x-component phase $\theta x^1=pi$, a y-component amplitude $Ay^1=5$, a y-component phase $\theta y^1=0$, a z-component amplitude $Az^1=5$, and a z-component phase $\theta z^1=pi/8$, and that wave 2 has an x-component amplitude $AX^2=5$, an x-component phase $\theta x^2=pi/2$, a y-component amplitude $Ay^2=7$, a y-component phase $\theta y^2=pi$, a z-component amplitude $Az^2=9$, and a z-component phase $\theta z^2=pi/4$. Note that the above mentioned number of constituent signals, and frequencies, amplitudes, and phase values are provided as an example and embodiments of the present invention are not limited to any particular number of constituent signals or frequency, amplitude, and phase values.

The electromagnetic field of a combined M constituent signals (e.g., the superimposed wave), where M is a natural number greater than 1, may be represented by equation 1 as follows:

$$\vec{E}c(t) = \sum_{m=1}^{M} \left( A_x^m e^{i\theta_x^m}, A_y^m e^{i\theta_y^m}, A_z^m e^{i\theta_z^m} \right) e^{i v^m t} \quad \text{(EQUATION 1)}$$

where A represents the amplitude, $\theta$ represents the phase, $\nu$ represents the frequency, e is Euler's number, i signifies the imaginary unit used to represent complex numbers (e.g., with a imaginary and a real part), M represents the number of constituent signals, and t represents time. For example, first and second samples of the combined signals (e.g., the superimposed wave) could be observed at time instances $t_0$ and $t_1$, which would be respectively represented by $\vec{E}c(t_0)$ and $\vec{E}c(t_1)$.

Determining frequencies for each of the constituent signals (S203) will be described first with respect to the 'X' dimension or 'X' component of equation 1, which may be represented by equation 2 as follows:

$$\left( \vec{E}c(t) \right)_x = \sum_{m=1}^{M} \left( A_x^m e^{i\theta_x^m} \right) e^{i v^m t} \quad \text{(EQUATION 2)}$$

N samples of the superimposed wave at time instances $t_0, \ldots, t_{N-1}$ are considered, where N is a natural number greater than 1. If it is assumed that the superimposed wave is evenly sampled during uniform time intervals $t_n = t_0 + n\delta$, where $0 \leq n \leq N-1$, then equation 2 may be re-written in terms of a discrete signal function $X[n]$ according to equation 3 as follows:

$$X[n] = \sum_{m=1}^{M} \left( A_x^m e^{i\theta_x^m} e^{i v^m t_0} \right) e^{i v^m n \delta} \quad \text{(EQUATION 3)}$$

where $\delta$ is a constant that can be adjusted to vary the sample rate. The unitary matrix pencil (UMP) method may be used to solve equations of the type shown in the following equation 4:

$$X[n] = \sum_{m=1}^{M} K_m (\alpha_m)^n \quad \text{(EQUATION 4)}$$

where $K_m$ may represent non-damping portion of the discrete signal $X[n]$ and $\alpha_m$ may represent a damping portion of the discrete signal $X[n]$. Thus, the UMP method can be used to solve equation 3 for individual frequencies $\nu^m$ when terms of equation 3 are properly mapped into equation 4. For example, the term $A_x^m e^{i\theta_x^m} e^{i v^m t_0}$ can be mapped into $K_m$ and the term $e^{i v^m n \delta}$ can be mapped into $\alpha_m$ thereby enabling the UMP method to be used to solve the individual frequencies $\nu^m$.

Conventional methods use the UMP method to estimate DOA for phased antenna arrays, where the index n represents multiple antenna sensors, each having a different location. Contrary to the conventional methods, exemplary embodiments of the present invention use the UMP to solve for complex exponentials for time samples from the same tripole sensor (e.g., a tripole radio antenna).

Use of the UMP method begins with construction of an $(N-L) \times (L+1)$ Hankel matrix Y whose columns are windowed versions of the original data, as shown in table 1 as follows:

TABLE 1

$$Y = \begin{bmatrix} X[0] & X[1] & \ldots & X[L] \\ X[1] & X[2] & \ldots & X[L+1] \\ \vdots & \vdots & \ldots & \vdots \\ \vdots & \vdots & \ldots & \vdots \\ X[N-1-L] & X[N-L] & \ldots & X[N-1] \end{bmatrix}$$

where the parameter L is denoted a pencil parameter and may be determined empirically for efficient noise filtering. The performance of the UMP method is controlled by parameters M, N, and L. The UMP method may provide accurate estimates for the frequency parameters $\nu$ when the relationship of $M \leq L \leq (N-M)$ is present. This also implies that efficient detection of M signals has at least 2*M time samples. In at least one embodiment of the present invention, a recommended range of values for the pencil parameter L is represented by the relationship of $N/3 \leq L \leq N/2$.

The matrix Y may be shown to be centro-hermitian such that a unitary transform matrix U converts into a purely real matrix $X_R = U^H Y U$. The transform matrix U may be derived based on the size of the matrix Y, and consists of an identity matrix and an exchange matrix. The real matrix $X_R$ may then be used for subsequent calculations, which may in some embodiments of the present invention reduce complexity by a factor of 4. A singular value decomposition (SVD) of the real matrix $X_R$ may be performed to compute a parameter $A_S$, which represents the M largest singular vectors of the real matrix $X_R$. M generalized eigenvalues $\gamma_1, \ldots, \gamma_m$ of the matrix $[\text{Re}(U^H J_1 U) A_S]^{-1} \text{Im}(U^H J_1 U) A_S$ may then be computed, where the matrix $J_1$ may be represented by table 2 as follows:

TABLE 2

$$J_1 = \begin{bmatrix} 1 & 0 & \ldots & 0 & 0 \\ 0 & 1 & \ldots & 0 & 0 \\ \vdots & \vdots & \ldots & \vdots & \vdots \\ \vdots & \vdots & \ldots & \vdots & \vdots \\ 0 & 0 & \ldots & 1 & 0 \end{bmatrix}$$

where the '$X^m$' component frequencies $\nu_x^m$ may be directly computed from the resulting eigenvalues as $\nu^m = 2 \tan^{-1}(\gamma_m)/\delta$. The '$Y^m$' and '$Z^m$' component frequencies may be computed in a manner similar to those described above for the '$X^m$' component frequency. The component frequencies for each 'm' incident signal may be combined to generate a constituent signal's corresponding frequency.

Determining amplitudes and phases for each dimension using the determined frequencies (S204) will be described first with respect to the 'X' frequency component. A system of over-specified linear equations may be generated using equation 3 as shown in equation 5 as follows:

$$\begin{bmatrix} X[0] \\ X[1] \\ \vdots \\ \vdots \\ \vdots \\ X[N-1] \end{bmatrix} = \Gamma \begin{bmatrix} A_x^1 e^{iv^1 t_0} e^{i\theta_x^1} \\ A_x^2 e^{iv^2 t_0} e^{i\theta_x^2} \\ \vdots \\ \vdots \\ \vdots \\ A_x^M e^{iv^{M1} t_0} e^{i\theta_x^M} \end{bmatrix} \quad \text{(EQUATION 5)}$$

where $\Gamma$ may be represented by equation 6 as follows:

$$\Gamma = \begin{bmatrix} 1 & 1 & \dots & 1 \\ e^{iv^1 \delta} & e^{iv^2 \delta} & \dots & e^{iv^M \delta} \\ \vdots & \vdots & \dots & \vdots \\ \vdots & \vdots & \dots & \vdots \\ \vdots & \vdots & \dots & \vdots \\ (e^{iv^1 \delta})^{N-1} & (e^{iv^2 \delta})^{N-1} & \dots & (e^{iv^M \delta})^{N-1} \end{bmatrix} \quad \text{(EQUATION 6)}$$

The system of linear equations may be solved using the Least Squares Method and SVD to get resulting coefficients $A_x^m e^{iv^m t_0} e^{i\theta_m^x}$, which include 'X' component amplitude and phases. The 'Y' and 'Z' component amplitudes and phases may be computed in a manner similar to those described above for the 'X' component amplitudes and phases.

The determined frequencies of each constituent signal can be matched to corresponding x, y, and z amplitude components and x, y, and z phase components. The combination of the matched elements (e.g., frequency, x, y, z amplitude components and x, y, z phase components can be used to obtain each of the constituent signals.

Determining a direction of arrival for each of the constituent signals from the determined frequencies, amplitudes, and phases (S205) will be discussed in more detail below. The electric components of an electromagnetic field of one of the constituent signals of the superimposed wave with carrier frequency $v$ may be represented by equation 7 as follows:

$$\vec{E}(t) = \{A_x e^{i\theta_x}, A_y e^{i\theta_y}, A_z e^{i\theta_z}\} e^{i(vt)} \quad \text{(EQUATION 7)}$$

where $A_x$, $A_y$, and $A_z$ represent the amplitude in the three dimensions of a constituent wave signal and $\theta_x$, $\theta_y$, and $\theta_z$ represent the corresponding phases. The DOA of the constituent signal can be represented by equation 8 as follows:

$$\vec{V}(t) = -\frac{\varepsilon_0}{2c} \text{Im}(\vec{E}(t) \times \vec{E}*(t) + c^2 \vec{B}(t) \times \vec{B}*(t)), \quad \text{(EQUATION 8)}$$

where $\varepsilon_0$ is constant that can be adjusted empirically, c is the speed of light, $\vec{E}*(t)$ is the complex conjugate of $\vec{E}(t)$, 'x' is a cross product, $\vec{B}(t)$ is the magnetic field of the incident signal, and $\vec{B}*(t)$ is the complex conjugate of $\vec{B}(t)$. $\vec{V}(t)$ represents the DOA of the constituent signal (e.g., an incoming radio wave), where 'Im (.)' represents an operator that extracts the imaginary part of a vector. If transversal fields are assumed, where $\vec{E}(t) \times \vec{E}*(t) \cong c^2 \vec{B}(t) \times \vec{B}*(t)$, then $\vec{V}(t)$ (eg., the DOA) may be represented by Equation 9 as follows:

$$\vec{V}(t) \cong -\text{Im}(\vec{E}(t) \times \vec{E}*(t)) \quad \text{(EQUATION 9)}$$

In at least one embodiment of the present invention, the relationships of N≧2M+2 (e.g., number of samples is greater than or equal to twice the number of signals plus 2) and L≈N/2 (e.g., the pencil parameter is equal to number of samples divided by 2) are maintained.

FIG. 3 illustrates a method 300 to determine a direction of arrival of constituent signals of a superimposed wave, according to an exemplary embodiment of the present invention. Referring to FIG. 3, the method includes observing N samples of the superimposed wave incident on a tripole sensor (S301), determining frequencies, x, y, z amplitude components, and x, y, z phase components from the observed samples (S302), determining an electric field for each of the constituent signals from the determined frequencies, x, y z amplitude components, and x, y, z phase components (S303), and determining a direction of arrival of each of the constituent signals of the superimposed wave respectively from the determined electric fields (S304). The frequencies are determining using the unitary matrix pencil method and N is a natural number greater than 2.

Referring to equation 8, determining the direction of arrival (S304) may include computing a cross product of the electric field, a complex conjugate of the electric field, and retaining only an imaginary part of a result of the cross product. As discussed above, a magnetic field of at least one of the constituent signals may be transverse to an electric field of the corresponding signal. Referring to table 1 and table 2, the frequencies may be determined by placing the samples into a Hankel matrix, generating a real matrix from only a real part of the Hankel matrix, performing a singular value decomposition on the real matrix to generate singular vectors, computing eigenvalues from the generated singular vectors, and determining the frequencies from the computed eigenvalues. As discussed above, the x, y, and z amplitudes and phases may be determined using a least squares method and singular value decomposition.

FIG. 4 illustrates an example of a computer system which may implement methods and/or systems of the present disclosure. The system and methods of the present disclosure, or part of the system and methods, may be implemented in the form of a software application running on a computer system, for example, a mainframe, personal computer (PC), handheld computer, server, etc. For example, the sampling unit 102, frequency determining unit 103, amplitude/phase determining unit 104, and direction determining unit 105 of FIG. 1 may be implemented as software application(s) that perform the methods described above with reference to corresponding aspects of FIGS. 2 and 3. The software application may be stored on a computer readable media (such as hard disk drive memory 1008) locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk 1008, via a link 1007. CPU 1001 may be the computer processor that performs the steps of the methods described above with reference to FIGS. 2 and 3.

The DOA that is determined by embodiments of the present invention may be output from the computer systems, for example through LAN interface 1006, through printer interface 1010, or on display unit 1011, and may be used to perform analysis and/or transformation of the received signals.

It is to be understood that exemplary embodiments disclosed above are illustrative only, as the invention may be modified and practiced in different but equivalent manners apparent to those skilled in the art having the benefit of the teachings herein. It is therefore evident that exemplary embodiments disclosed herein may be altered or modified and all such variations are considered within the scope and spirit of the invention.

What is claimed is:

1. A system to determine a direction of arrival of each of a plurality of constituent signals of a superimposed wave, the system comprising:
    a tripole radio antenna receiving the superimposed wave;
    a sampling unit configured to periodically sample an output of the tripole radio antenna to generate at least two samples;
    a frequency determining unit configured to determine frequencies for each dimension of the constituent signals by performing a unitary matrix pencil method on the at least two samples;
    an amplitude and phase determining unit configured to determine x, y, z amplitudes and x, y, z phases for each constituent signal using the determined frequencies; and
    a direction determining unit configured to determine a direction of arrival for each of the constituent signals from the determined frequencies, amplitudes, and phases.

2. The system of claim 1, wherein the frequency determining unit is configured to determine the frequencies by placing the samples into a Hankel matrix, generate a real matrix from only a real part of the Hankel matrix, perform a singular value decomposition on the real matrix to generate singular vectors, and compute eigenvalues from the generated singular vectors.

3. The system of claim 2, wherein the system is further configured to perform a least squares method to determine the x, y, z amplitudes and x, y, z phases from each of the frequencies.

4. The system of claim 2, wherein the at least two time periods have a uniform time interval.

5. The system of claim 2, wherein the at least two time periods are consecutive.

6. A method to determine a direction of arrival of a signal, the method comprising:
    receiving a superimposed wave incident on a single tripole sensor, wherein the wave comprises a plurality of constituent signals;
    sampling in a computer processor the superimposed wave during at least two different time periods to generate at least two samples;
    determining in a computer processor frequencies for each of the constituent signals by performing a unitary matrix pencil method on the at least two samples;
    determining in a computer processor amplitudes and phases for each of the x, y, z dimensions using the determined frequencies, wherein for each of the constituent signals there are amplitude and phase pairs for each of the x, y, and z dimensions; and
    determining in a computer system a direction of arrival for each of the constituent signals from the determined frequencies, amplitudes, and phases.

7. The method of claim 1, wherein determining the frequencies comprises:
    representing the at least two samples as a plurality of first discrete signal functions each comprising a summation of terms, each term corresponding to a respective one of the constituent signals, and each term comprising a first sub-term based on an amplitude, phase, and frequency of a dimension of the corresponding constituent signal and a second sub-term based on the frequency of the dimension;
    converting each of the first discrete signal functions respectively to second discrete signal functions by mapping each corresponding first sub-term into a non-damping term of the second discrete signal function, and mapping each corresponding second sub-term into a damping term of the second discrete function; and
    performing the unitary matrix pencil method on the second discrete signal functions.

8. The method of claim 7, wherein each first sub-term is further based on a time that the sample is received and each second sub-term is further based on a sample number of the corresponding sample.

9. The method of claim 7, wherein the determining of the x, y, z amplitudes and x, y, z phases for each of the frequencies is performed using a least squares method.

10. The method of claim 7, wherein the at least two time periods have a uniform time interval.

11. The method of claim 7, wherein the at least two time periods are consecutive.

12. An apparatus comprising a computer readable medium embodying instructions executable by a processor to perform method steps for determining a direction of arrival of each of a plurality of constituent signals of a superimposed wave, the method steps comprising instructions for:
    sampling the superimposed wave incident on a single tripole sensor during at least two different time periods to generate at least two samples;
    determining frequencies, amplitudes and phases for each dimension of the constituent signals by performing a unitary matrix pencil method (UMP) on the at least two samples; and
    determining a direction of arrival for each of the constituent signals from the determined frequencies, amplitudes, and phases,
    wherein the plurality of constituent signals have a count of M, the at least two samples number have a count of N, N and M are natural numbers, and N is at least 2*M.

13. The apparatus of claim 12, wherein N is 2*M+2.

14. The apparatus of claim 12, wherein a pencil parameter of the UMP ranges between N/3 to N/2.

15. The apparatus of claim 12, wherein the determining of the amplitudes and phases for each dimension from each of the frequencies is performed using a least squares method.

16. The apparatus of claim 12, wherein the at least two time periods have a uniform time interval.

17. A method to determine a direction of arrival of constituent signals of a superimposed wave incident on a tripole sensor, the method comprising:
    observing in a computer system N samples of a superimposed wave incident on a tripole sensor, wherein N is a natural number greater than 2;
    determining in a computer system frequencies, x, y, z amplitude components, and x, y, z phase components from the observed samples, wherein the frequencies are determined using a unitary matrix pencil (UMP) method;
    determining in a computer system an electric field for each of the constituent signals from the determined frequencies, x, y, z amplitude components and x, y, z phase components; and determining in a computer system a direction of arrival of each of the constituent signals of the superimposed wave respectively from the determined electric fields.

18. The method of claim 17, wherein determining the direction of arrival comprises:
computing a cross product of the electric field and a complex conjugate of the electric field; and
retaining only an imaginary part of a result of the cross product.

19. The method of claim 17, wherein a magnetic field of at least one of the incident waves is transverse to the electric field.

20. The method of claim 17, wherein determining the frequencies comprises:
placing the observed samples into a Hankel matrix;
generating a real matrix from only a real part of the Hankel matrix;
performing a singular value decomposition on the real matrix to generate singular vectors;
computing eigenvalues from the generated singular vectors; and
determining the frequencies from the computed eigenvalues.

21. The method of claim 17, wherein the constituent signals have a count of M, N is at least 2*M+2, and a matrix pencil parameter of the UMP is equal to N/2.

22. The method of claim 17, wherein the determining of the x, y, and z amplitude components and x, y, z phase components is performed using a least squares method and singular value decomposition.

23. The method of claim 17, wherein the samples are received during uniform time intervals.

24. An apparatus comprising: a computer readable medium embodying instructions executable by a processor to perform method steps for determining a direction of arrival of each of a plurality of constituent signals of a superimposed wave, the method steps comprising instructions for:
observing N samples of a superimposed wave incident on a tripole sensor, wherein N is a natural number greater than 2;
determining frequencies, x, y, z amplitude components, and x, y, z phase components from the observed samples, wherein the frequencies are determined using a unitary matrix pencil (UMP) method;
determining an electric field for each of the constituent signals from the determined frequencies, x, y, z amplitude components and x, y, z phase components; and
determining a direction of arrival of each of the constituent signals of the superimposed wave respectively from the determined electric fields.

25. The apparatus of claim 24, wherein the constituent signals have a count M, and N is equal to 2*M+2.

* * * * *